United States Patent
Wang

(10) Patent No.: US 11,752,635 B2
(45) Date of Patent: Sep. 12, 2023

(54) MOBILE ROBOT PERFORMING MULTIPLE DETECTIONS USING IMAGE FRAMES OF SAME OPTICAL SENSOR

(71) Applicant: PixArt Imaging Inc., Hsin-Chu County (TW)

(72) Inventor: Guo-Zhen Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 424 days.

(21) Appl. No.: 17/064,776

(22) Filed: Oct. 7, 2020

(65) Prior Publication Data

US 2021/0016449 A1 Jan. 21, 2021

Related U.S. Application Data

(63) Continuation-in-part of application No. 16/929,232, filed on Jul. 15, 2020, which is a continuation-in-part (Continued)

(51) Int. Cl.
*B25J 9/16* (2006.01)
*B25J 13/08* (2006.01)
(Continued)

(52) U.S. Cl.
CPC ............. *B25J 9/1697* (2013.01); *B25J 9/163* (2013.01); *B25J 9/1653* (2013.01); *B25J 13/089* (2013.01); *G06T 7/70* (2017.01); *A47L 11/4011* (2013.01); *A47L 2201/04* (2013.01); *B25J 5/00* (2013.01); *B25J 9/0003* (2013.01); (Continued)

(58) Field of Classification Search
CPC ........ B25J 9/1697; B25J 9/163; B25J 9/1653; B25J 9/0003; B25J 13/089; B25J 5/00; B25J 11/0085; G06T 7/70; G06T 2207/20081; A47L 11/4011; A47L 2201/04; G05D 1/0221; G05D 1/0238; G05D 1/0248; G05D 1/0274; G05D 2201/0203

See application file for complete search history.

(56) References Cited

U.S. PATENT DOCUMENTS

| | | |
|---|---|---|
| 4,954,962 A | 9/1990 | Evans, Jr. et al. |
| 5,247,173 A | 9/1993 | Benchetrit et al. |

(Continued)

OTHER PUBLICATIONS

Apostolopoulos et al., "Mobile Robot for Automatic Installation of Floor Tiles", Apr. 1996, IEEE, International Conference on Robotics and Automation Minneapolis, Minnesota, pp. 3652-3657 (Year: 1996).*

*Primary Examiner* — Khoi H Tran
*Assistant Examiner* — Nhi Q Bui
(74) *Attorney, Agent, or Firm* — WPAT, P.C

(57) ABSTRACT

There is provided a mobile robot that controls an exposure time of an optical sensor during a time interval during which images of a gap between tiles are captured. At an end of the time interval that an image of a gap between tiles is captured, the exposure time of the optical sensor is adjust to the exposure time being used right before the time interval to avoid high brightness of the captured image while the image of a gap between tiles is suddenly disappeared from a field of view of the optical sensor.

20 Claims, 10 Drawing Sheets

Related U.S. Application Data of application No. 16/425,955, filed on May 30, 2019, now Pat. No. 11,510,539, which is a continuation-in-part of application No. 15/841,376, filed on Dec. 14, 2017, now Pat. No. 10,627,518.

(60) Provisional application No. 62/514,349, filed on Jun. 2, 2017.

(51) Int. Cl.
| | |
|---|---|
| *G06T 7/70* | (2017.01) |
| *G05D 1/02* | (2020.01) |
| *A47L 11/40* | (2006.01) |
| *B25J 11/00* | (2006.01) |
| *B25J 9/00* | (2006.01) |
| *B25J 5/00* | (2006.01) |

(52) U.S. Cl.
CPC ......... *B25J 11/0085* (2013.01); *G05D 1/0221* (2013.01); *G05D 1/0238* (2013.01); *G06T 2207/20081* (2013.01)

(56) References Cited

U.S. PATENT DOCUMENTS

| | | |
|---|---|---|
| 6,844,871 B1 | 1/2005 | Hinckley et al. |
| 9,299,516 B2 | 3/2016 | Chen et al. |
| 9,323,347 B2 | 4/2016 | Liang |
| 9,606,639 B2 | 3/2017 | Kao et al. |
| 9,727,148 B2 | 8/2017 | Chin et al. |
| 2002/0085116 A1 | 7/2002 | Kuwano et al. |
| 2003/0067613 A1 | 4/2003 | Ishikawa et al. |
| 2005/0206617 A1 | 9/2005 | Moyer et al. |
| 2006/0262094 A1 | 11/2006 | Chang |
| 2008/0260262 A1 | 10/2008 | Lim et al. |
| 2010/0123655 A1 | 5/2010 | Lai |
| 2011/0176709 A1* | 7/2011 | Park ....................... G06T 7/521 382/106 |
| 2012/0019677 A1 | 1/2012 | Wong et al. |
| 2012/0162072 A1 | 6/2012 | Chen et al. |
| 2013/0072771 A1 | 3/2013 | Gu et al. |
| 2013/0127714 A1 | 5/2013 | Gu et al. |
| 2013/0127721 A1 | 5/2013 | Gu et al. |
| 2013/0127722 A1 | 5/2013 | Gu et al. |
| 2013/0131474 A1 | 5/2013 | Gu et al. |
| 2013/0138247 A1 | 5/2013 | Gutmann et al. |
| 2013/0184865 A1* | 7/2013 | Guo .................... G05D 1/0274 901/1 |
| 2013/0215257 A1 | 8/2013 | Huang et al. |
| 2013/0329962 A1 | 12/2013 | Kao et al. |
| 2014/0323835 A1 | 10/2014 | Kao |
| 2015/0009146 A1 | 1/2015 | Song |
| 2015/0160743 A1 | 6/2015 | Song et al. |
| 2015/0168954 A1* | 6/2015 | Hickerson ............... G01S 17/89 901/1 |
| 2016/0070947 A1 | 3/2016 | Bogaki et al. |
| 2016/0119747 A1* | 4/2016 | Ryan .................. H04B 10/1149 398/118 |
| 2016/0238773 A1 | 8/2016 | Shei et al. |
| 2016/0288330 A1 | 10/2016 | Konolige |
| 2016/0306446 A1 | 10/2016 | Chung et al. |
| 2016/0345847 A1 | 12/2016 | Gu et al. |
| 2017/0061226 A1 | 3/2017 | Kok et al. |
| 2017/0076442 A1* | 3/2017 | Schoenmeyer ........... G06T 7/11 |
| 2017/0076521 A1 | 3/2017 | Chuang et al. |
| 2019/0087013 A1 | 3/2019 | Chang et al. |
| 2019/0113606 A1 | 4/2019 | Mathy et al. |
| 2020/0241550 A1 | 7/2020 | Lin et al. |

\* cited by examiner

# MOBILE ROBOT PERFORMING MULTIPLE DETECTIONS USING IMAGE FRAMES OF SAME OPTICAL SENSOR

RELATED APPLICATIONS

The present application is a continuation-in-part application of U.S. patent application Ser. No. 16/929,232 filed on Jul. 15, 2020, which is a continuation-in-part application of U.S. patent application Ser. No. 16/425,955 filed on May 30, 2019, which is a continuation-in-part application of U.S. patent application Ser. No. 15/841,376 filed on Dec. 14, 2017, which claims the priority benefit of U.S. Provisional Application Ser. No. U.S. 62/514,349, filed on Jun. 2, 2017, the disclosures of which are hereby incorporated by reference herein in their entirety.

BACKGROUND

1. Field of the Disclosure

This disclosure generally relates to a mobile robot and, more particularly, to a mobile robot that performs the obstacle avoidance, positioning and object recognition according to image frames captured by the same optical sensor corresponding to lighting of different light sources.

2. Description of the Related Art

The smart home is one part of developing a smart city, and a cleaning robot has almost become one standard electronic product in a smart home. Generally, the cleaning robot is arranged with multiple functions to improve the user experience, e.g., including mapping of an operation area, obstacle detection and avoidance during operation. The current cleaning robot is employed with multiple types of sensors to perform these different detecting functions.

For example, the cleaning robot includes a sensor arranged at a top surface thereof to implement the visual simultaneous localization and mapping (VSLAM) by capturing images above the path by which the cleaning robot passes. In addition, the cleaning robot further adopts a front sensor to implement the obstacle detection and avoidance by capturing images in front of a moving direction of the mobile robot.

That is, the conventional cleaning robot needs multiple sensors to perform different detecting functions.

Accordingly, the present disclosure provides a mobile robot that performs the obstacle avoidance, positioning and object recognition according to the image frames captured by the same one optical sensor corresponding to lighting of different light sources.

SUMMARY

The present disclosure provides a mobile robot that performs the obstacle avoidance according to the image frame captured by an optical sensor when a laser diode is emitting light, and performs the visual simultaneous localization and mapping (VSLAM) according to the image frame captured by the optical sensor when a light emitting diode is emitting light.

The present disclosure further provides a mobile robot that determines a region of interest according to the image frame captured by an optical sensor when a laser diode is emitting light, and performs the object recognition in the region of interest of the image frame captured by the optical sensor when a light emitting diode is emitting light to reduce the computation loading and power consumption as well as improve the recognition correctness.

The present disclosure provides a mobile robot including a first optical sensor, a light source, a second optical sensor and a processor. The first optical sensor has a field of view toward a bottom opening of the mobile robot, and is configured to capture a first image frame using an exposure time determined by an auto exposure. The light source is configured to project a light section toward a moving direction of the mobile robot. The second optical sensor is configured to capture a second image frame containing the light section. The processor is electrically coupled to the first optical sensor and the second optical sensor, and configured to recognize whether the second image frame contains an image of tiles, predict a time interval during which the field of view of the first optical sensor contains a gap image between tiles when the second image frame is recognized containing the image of tiles, and turn off the auto exposure of the first optical sensor during the time interval.

The present disclosure further provides a mobile robot including a first optical sensor, a light source, a second optical sensor and a processor. The first optical sensor has a field of view toward a bottom opening of the mobile robot, and is configured to capture a first image frame using an exposure time determined by an auto exposure. The light source is configured to project a light section toward a moving direction of the mobile robot. The second optical sensor is configured to capture a second image frame containing the light section. The processor is electrically coupled to the first optical sensor and the second optical sensor, and configured to recognize whether the second image frame contains an image of tiles, predict a time interval during which the field of view of the first optical sensor contains a gap image between tiles when the second image frame is recognized containing the image of tiles, and control the first optical sensor to capture the first image frame at an end of the time interval using a resumed exposure time identical to a recorded exposure time being used right before the time interval.

The present disclosure further provides an operating method of a mobile robot, which includes a front optical sensor, a light source and a bottom optical sensor. The operating method includes the steps of: projecting at least one light section toward a moving direction of the mobile robot; capturing a front image frame using the front optical sensor; recognizing whether the front image frame contains an image of tiles; predicting a time interval during which the bottom optical sensor captures images of a gap between tiles; and determining an exposure time of the bottom optical sensor at an end of the time interval not using an auto exposure.

The present disclosure further provides a mobile robot including a first laser light source, a second laser light source, a LED light source and an optical sensor. The first laser light source is configured to project a transverse light section toward a moving direction at a first time interval. The second laser light source is configured to project a longitudinal light section toward the moving direction at a second time interval. The LED light source is configured to illuminate a front area of the moving direction at a third time interval. The optical sensor is configured to respectively capture a first image frame, a second image frame and a third image frame within the first time interval, the second time interval and the third time interval.

In the present disclosure, the mobile robot realizes multiple detecting functions by using a single optical sensor incorporating with different light sources activating at different times.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The mobile robot of the present disclosure is to operate using a single optical sensor incorporating with different light sources. The linear light source is used to find an obstacle and measure a distance of the obstacle as a reference for turning a moving direction of the robot. The illumination light source is used to illuminate a front area for the visual simultaneous localization and mapping (VSLAM) and the object recognition.

Figure 1A:
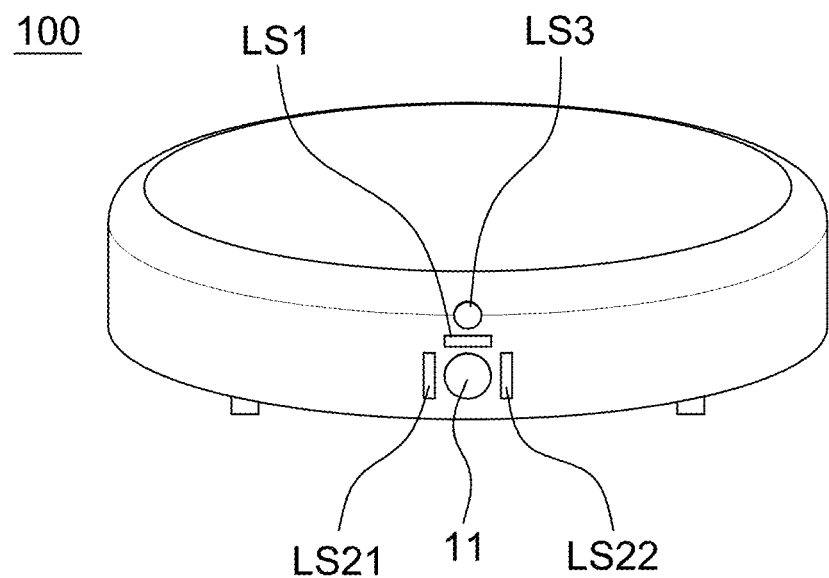
FIG. 1A is a schematic diagram of a mobile robot according to one embodiment of the present disclosure.

Referring to FIG. 1A, it is a schematic diagram of a mobile robot 100 according to one embodiment of the present disclosure. FIG. 1A shows that the mobile robot 100 is a cleaning robot, but the present disclosure is not limited thereto. The mobile robot 100 is any electronic robot that moves according to the imaging result to perform the transportation, communication and guiding.

Figure 1B:
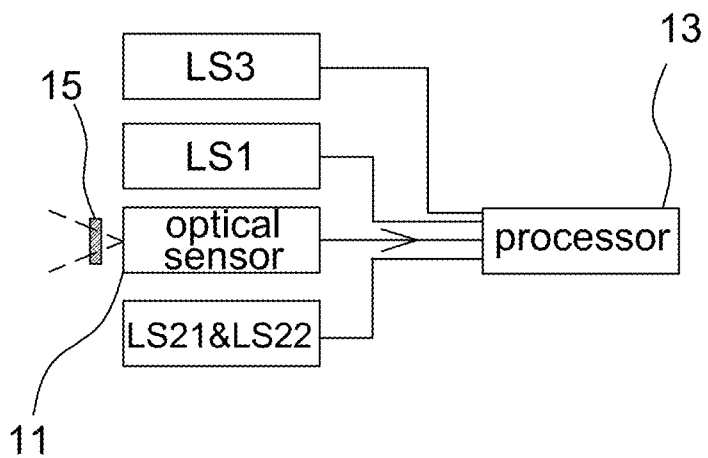
FIG. 1B is a schematic block diagram of elements of a mobile robot according to one embodiment of the present disclosure.

Please referring to FIG. 1B together, it is a schematic block diagram of a mobile robot 100 according to one embodiment of the present disclosure. The mobile robot 100 includes a first light source LS1, second light sources LS21 and LS22, a third light source LS3, an optical sensor 11 and a processor 13. The processor 13 is an application specific integrated circuit (ASIC) or a micro controller unit (MCU) that implements its functions using software, hardware and/or firmware. Although FIG. 1B shows two second light sources, it is only intended to illustrate but not to limit the present disclosure. The mobile robot 100 may include only one second light source.

The first light source LS1 includes, for example, a laser light source and a diffractive optical element. The diffractive optical element causes light emitted by the laser light source to generate a transverse projecting light after passing thereby such that the first light source LS1 projects a transverse light section toward a moving direction. The moving direction is along a side arranging the first light source LS1, the second light sources LS21 and LS22, the third light source LS3 and the optical sensor 11.

The second light sources LS21 and LS22 respectively include, for example, a laser light source and a diffractive optical element. The diffractive optical element causes light emitted by the laser light source to generate a longitudinal projecting light after passing thereby such that the second light sources LS21 and LS22 respectively project a longitudinal light section toward the moving direction.

In the present disclosure, the laser light source is, for example, an infrared laser diode (IR LD).

The third light source LS3 is, for example, an IR light emitting diode (LED), and used to illuminate a front area of the moving direction. An area illuminated by the third light source LS3 is preferably larger than or equal to a field of view of the optical sensor 11. In the present disclosure, when the third light source LS3 is lighted up, the first light source LS1 as well as the second light sources LS21 and LS22 are turned off.

Figure 2:
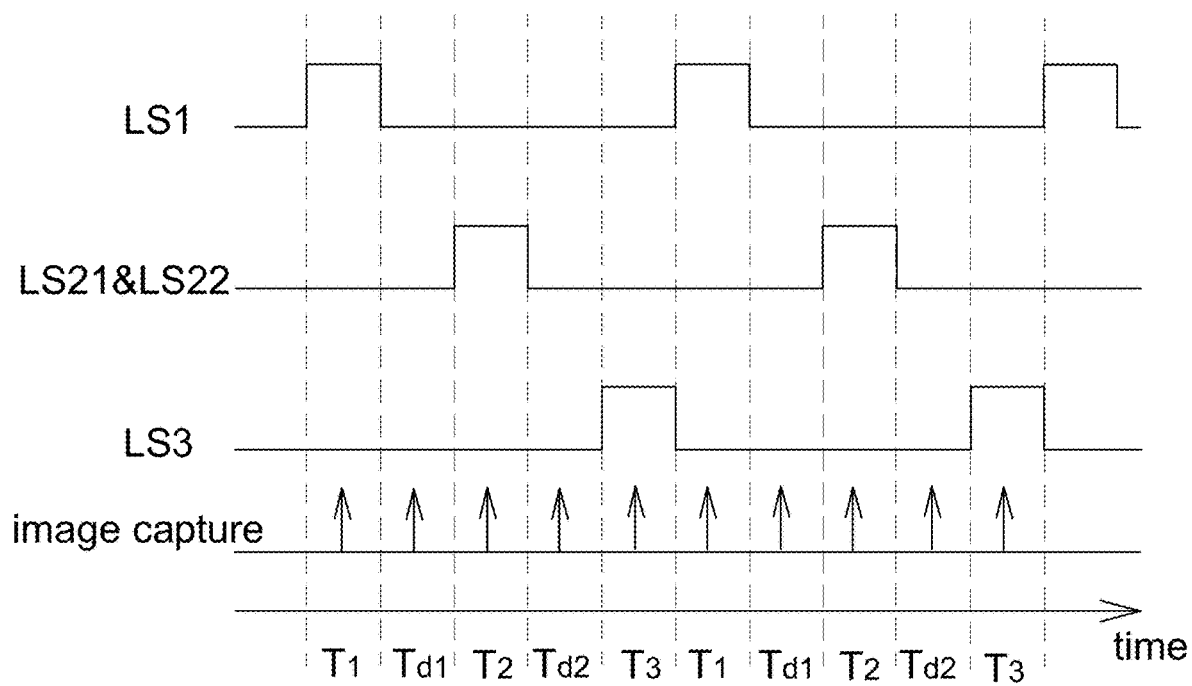
FIG. 2 is an operational timing diagram of a mobile robot according to a first embodiment of the present disclosure.

Please referring to FIG. 2, it is an operational timing diagram of a mobile robot 100 according to a first embodiment of the present disclosure. The first light source LS1 projects a transverse light section toward the moving direction at a first time interval T1. The second light sources LS1 and LS2 respectively project a longitudinal light section toward the moving direction at a second time interval T2. The third light source LS3 illuminates a front area of the moving direction at a third time interval T3.

Figure 6A:
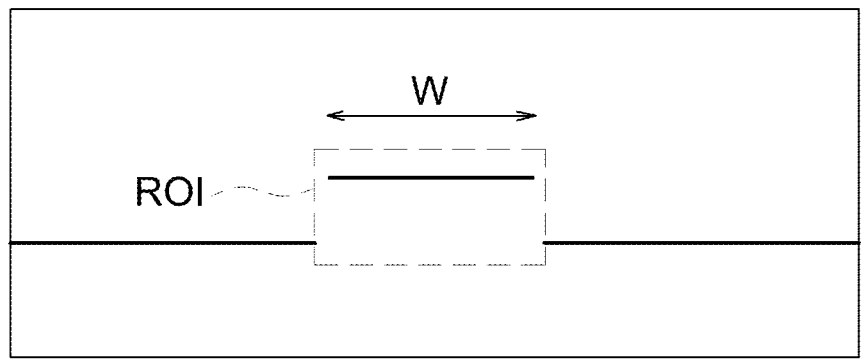
FIG. 6A is a schematic diagram of an image frame associated with a first light source and captured by an optical sensor of a mobile robot according to one embodiment of the present disclosure.
Figure 6B:
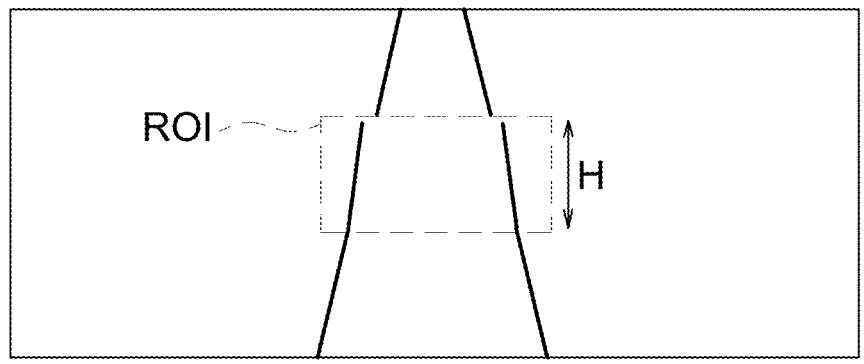
FIG. 6B is a schematic diagram of an image frame associated with a second light source and captured by an optical sensor of a mobile robot according to one embodiment of the present disclosure.

The optical sensor 11 is, for example, a CCD image sensor or a CMOS image sensor that captures a first image frame, a second image frame and a third image frame respectively within the first time interval T1, the second time interval T2 and the third time interval T3 using a sampling frequency. When the first image frame contains an obstacle, the first image frame has a broken line as shown in FIG. 6A; whereas, when the first image frame does not contain any obstacle, the first image frame only has a continuous (no broken line) transverse line. When the second image frame contains an obstacle, the second image frame has at least one broken line as shown in FIG. 6B, wherein an angle of the broken line is determined according a shape of obstacle and not limited to that shown in FIG. 6B; whereas, when the second image frame does not contain any obstacle, the second image frame only has two continuous (no broken line) tilted line. It is appreciated that FIGS. 6A and 6B are only intended to illustrate but not to limit the present disclosure.

It is appreciated that as the second light sources LS21 and LS22 project two parallel light sections on a moving surface, in the second image frame captured by the optical sensor 11, two parallel light sections present tilted lines. In addition, FIG. 6B only shows projected light sections on the moving surface captured by the optical sensor 11. When there is a wall in front of the mobile robot 100, the upper part of the second image frame will appear two parallel longitudinal light sections projected by the second light sources LS21 and LS22.

The position of broken line in the image frame reflects a position of the obstacle in front of the mobile robot 100. As long as the relationship between the position of broken line in the image frame and the actual distance of obstacles is previously recorded, a distance of one obstacle from the mobile robot 100 is obtainable when an image frame containing a broken line is captured.

As shown in FIG. 6A, the processor 13 already knows a predetermined distance from a transverse light section projected in front of the mobile robot 100 by the first light source LS1. Using the triangulation, the processor 13 calculates the distance and width of an obstacle when a broken line appears in an image of the transverse light section.

As shown in FIG. 6B, the processor 13 already knows longitudinal light sections being projected in front of the mobile robot 100 by the second light sources LS21 and LS22. Using the triangulation, the processor 13 calculates the distance and height of an obstacle according to a position and length in an image of the longitudinal light sections (i.e., tilted line) when at least one broken line appears in the image of the longitudinal light sections.

The processor 13 is electrically coupled to the first light source LS1, the second light sources LS21 and LS22, the third light source LS3 and the optical sensor 11, and used to control ON/OFF of light sources and the image capturing. The processor 13 further performs the range estimation according to the first image frame (e.g., FIG. 6A) and the second image frame (e.g., FIG. 6B), and performs the VSLAM according to the third image frame (containing object images actually being acquired), wherein details of the VSLAM are known to the art and thus are not described herein. The present disclosure is to execute different detections according to image frames captured by the same optical sensor 11 corresponding to the lighting of different light sources.

Referring to FIG. 2 again, the optical sensor 11 further captures a first dark image frame within a first dark interval Td1 of first light source behind the first time interval T1. The first dark image frame is used for differencing with the first image frame. The optical sensor 11 further captures a second dark image frame within a second dark interval Td2 of second light source behind the second time interval T2. The second dark image frame is used for differencing with the second image frame. For example, the processor 13 subtracts the first dark image frame from the first image frame, and subtracts the second dark image frame from the second image frame to eliminate background noises.

Although FIG. 2 shows that the first dark interval Td1 is behind the first time interval T1 and the second dark interval Td2 is behind the second time interval T2, the present disclosure is not limited thereto. In other aspects, the first dark interval Td1 is arranged prior to the first time interval T1 and the second dark interval Td2 is arranged prior to the second time interval T2. In another aspect, the optical sensor 11 captures only one dark image frame (e.g., prior to T1, between T1 and T2 or behind T2) within every cycle (e.g., an interval sequentially lighting every light source). The processor 13 subtracts the dark image frame from the first image frame and subtracts the dark image frame (the same one) from the second image frame. In this way, background noises are also cancelled and the total frame rate is increased.

In one aspect, the optical sensor 11 includes a pixel array. All pixels of the pixel array receive incident light via an IR light filter. For example, FIG. 1B shows that an IR pass filter 15 is further arranged in front of the optical sensor 11. The IR pass filter 15 is formed with an optics (e.g., coating on a lens) in front of the pixel array, or directly arranged upon every pixel of the pixel array.

Figure 3:
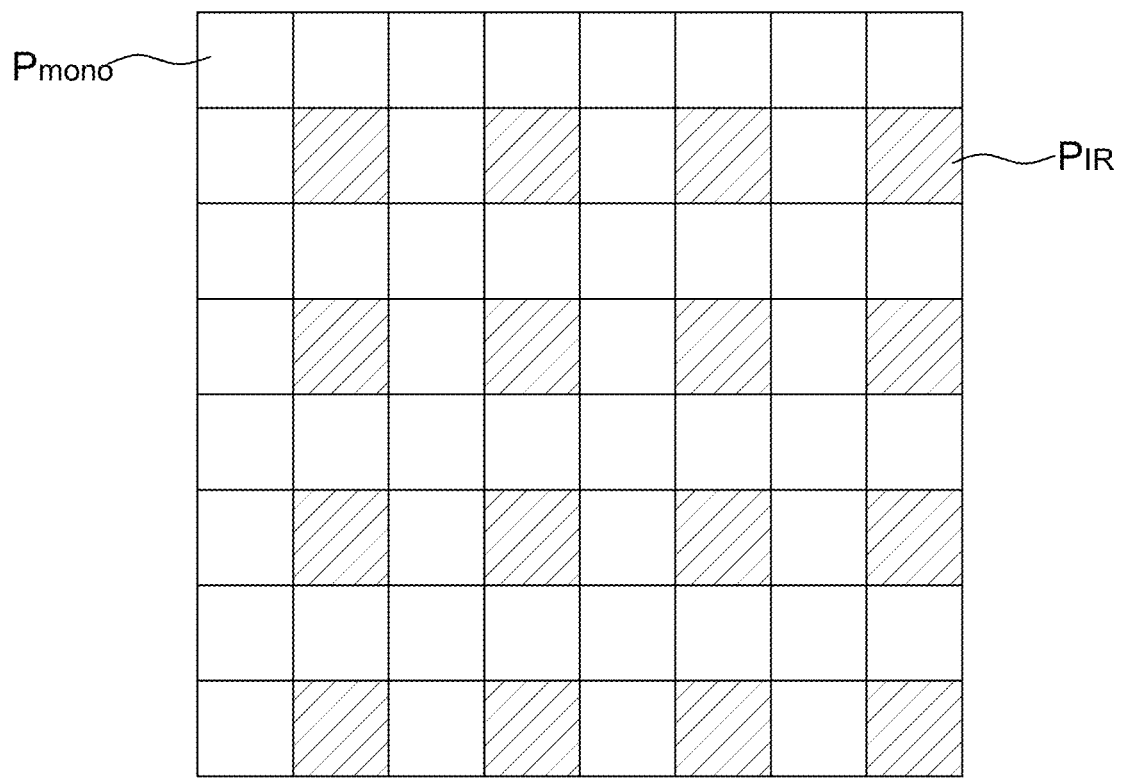
FIG. 3 is a schematic diagram of a pixel array of a mobile robot according to one embodiment of the present disclosure.

In another aspect, the pixel array of the optical sensor 11 includes a plurality of first pixels $P_{IR}$ and a plurality of second pixels $P_{mono}$, as shown in FIG. 3. The first pixels $P_{IR}$ are IR pixels, i.e. receiving incident light via a IR pass filter/film. The second pixels $P_{mono}$ receive incident light without via a IR pass filter/film. Preferably, the second pixels $P_{mono}$ receive incident light without passing any filter element. The incident light is referred to reflected light from the floor, wall and object in front of the mobile robot 100.

In the aspect including two pixel types, the first image frame and the second image frame mentioned above are formed by pixel data generated by the plurality of first pixels $P_{IR}$. That is, the processor 13 performs the range estimation only according to pixel data generated by the plurality of first pixels $P_{IR}$. The third image frame mentioned above is formed by pixel data generated by both the plurality of first pixels $P_{IR}$ and the plurality of second pixels $P_{mono}$ since the first pixels $P_{IR}$ and the second pixels $P_{mono}$ both detect infrared light when the third light source LS3 is emitting light. The processor 13 is arranged to process the pixel data corresponding to the lighting of different light sources.

In one aspect, the plurality of first pixels $P_{IR}$ and the plurality of second pixels $P_{mono}$ of the pixel array are arranged as a chessboard pattern as shown in FIG. 3. In other aspects, the first pixels $P_{IR}$ and the second pixels $P_{mono}$ are arranged in other ways, e.g., a left part or an upper part of the pixel array is arranged with the first pixels $P_{IR}$, and a right part or a lower part of the pixel array is arranged with the second pixels $P_{mono}$, but not limited thereto.

In the aspect that the first pixels $P_{IR}$ and the second pixels $P_{mono}$ are arranged in a chessboard pattern, the processor 13 further performs the pixel interpolation on the first image frame and the second image frame at first so as to fill interpolated data at positions in the first image frame and the second image frame corresponding the second pixels $P_{mono}$. After the pixel interpolation, the range estimation is performed.

When the pixel array of the optical sensor 11 is arranged as the chessboard pattern, the mobile robot 100 of the present disclosure may operate in another way to increase the frame rate of the range estimation and positioning (e.g., using VSLAM). In the aspect of FIG. 2, the frame rate of the range estimation and positioning is ⅕ of the sampling frequency of the optical sensor 11.

Figure 4:
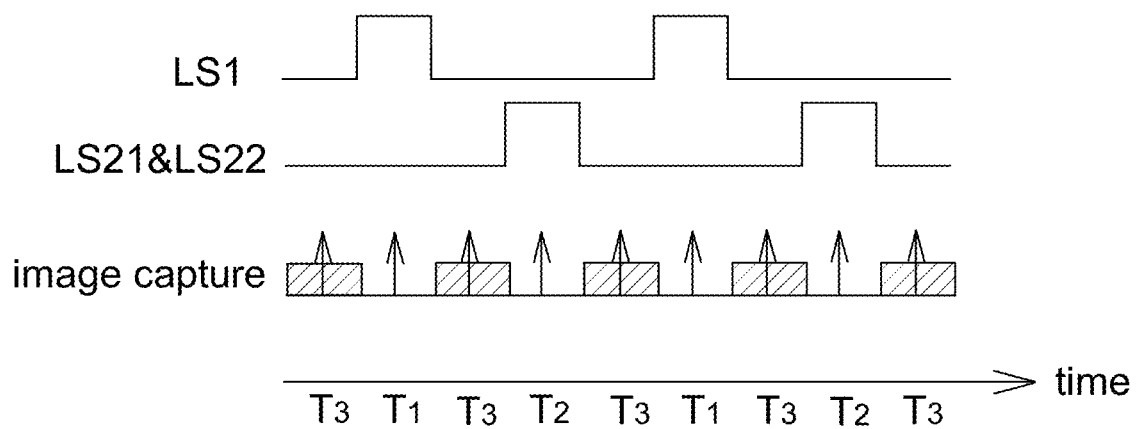
FIG. 4 is an operational timing diagram of a mobile robot according to a second embodiment of the present disclosure.

Referring to FIG. 4, it is an operational timing diagram of a mobile robot 100 according to a second embodiment of the present disclosure. The first light source LS1 projects a transverse light section toward the moving direction within a first time interval T1. The second light sources LS21 and LS22 respectively project a longitudinal light section toward the moving direction within a second time interval T2.

The pixel array of the optical sensor 11 captures a first image frame, a second image frame and a third image frame respectively within the first time interval T1, the second time interval T2 and a third time interval T3 between the first time interval T1 and the second time interval T2. That is, when the pixel array of the optical sensor 11 captures the third image frame, all light sources are not turned on. In FIG. 4, the third time interval T3 is shown by rectangular regions filled with slant lines.

The processor 13 performs the range estimation (e.g., including finding an obstacle and calculating a distance therefrom) according to the first image frame and the second image frame, wherein the first image frame and the second image frame are formed by pixel data generated by the plurality of first pixels $P_{IR}$. That is, when the first light source LS1 as well as the second light sources LS21 and LS22 are lighted up, pixel data associated with the first pixels $P_{IR}$ is not influenced by other colors of light, and thus the processor 13 is arranged to perform the range estimation according to the pixel data only associated with the plurality of first pixels $P_{IR}$.

In this embodiment, the third image frame is formed by pixel data generated by the plurality of second pixels $P_{mono}$.

Similarly, the processor 13 further performs the pixel differencing between the first image frame and the pixel data in the third image frame associated with the first pixels $P_{IR}$, and performs the pixel differencing between the second image frame and the pixel data in the third image frame associated with the first pixels $P_{IR}$ so as to eliminate background noises.

Similarly, when the first pixels $P_{IR}$ and the second pixels $P_{mono}$ are arranged in the chessboard pattern, before performing the range estimation, the processor 13 further performs the pixel interpolation on the first image frame and the second image frame to fill interpolated data at positions in the first image frame and the second image frame corresponding to the second pixels $P_{mono}$ at first. Then, the range estimation is performed.

In the second embodiment, the processor 13 performs the VSLAM according to pixel data in the third image frame associated with the second pixels $P_{mono}$. In this embodiment, the third light source LS3 is not lighted (e.g., the third light source LS3 may be omitted). Since the pixel data generated by the first pixels $P_{IR}$ exclude components outside IR spectrum, the third image frame of this embodiment is formed by pixel data generated by the plurality of second pixels $P_{mono}$. In addition, before performing the VSLAM according to the third image frame, the processor 13 further performs the pixel interpolation on the third image frame so as to fill interpolated data at positions in the third image frame corresponding to the first pixels $P_{IR}$.

It is seen from FIG. 4 that a frame rate of the range estimation is increased to ¼ (e.g., a frame period including T1+T2+2×T3) of the sampling frequency of the optical sensor 11, and a frame rate of the VSLAM is increased to ½ of the sampling frequency of the optical sensor 11.

However, when ambient light is not enough, the processor 13 may not able to correctly perform the VSLAM without lighting the third light source LS3. To solve this problem, the processor 13 further identifies ambient light strength according to the third image frame, e.g. comparing with a brightness threshold. When identifying that the ambient light is weak, the processor 13 further changes the lighting timing of the first light source LS1 as well as the second light sources LS21 and LS22. For example, the processor 13 controls the lighting of light sources and the image capturing as shown in FIG. 2. That is, under strong ambient light (e.g., an average brightness of the third image frame larger than a brightness threshold), the mobile robot 100 operates using the timing of FIG. 4; whereas under weak ambient light (e.g., the average brightness of the third image frame smaller than the brightness threshold), the mobile robot 100 operates using the timing of FIG. 2.

The present disclosure further provides a mobile robot that performs the ranging estimation and obstacle recognition according to images captured by the same optical sensor 11. When identifying that one obstacle is a specific object, e.g., a wire or socks, the mobile robot 100 directly moves across the obstacle; whereas when identifying that one obstacle is an electronic device, e.g., a cell phone, the mobile robot 100 dodges the electronic device without moving across it. The obstacle that can be moved across is determined previously according to different applications.

The mobile robot 100 of this embodiment is also shown as FIGS. 1A and 1B including a first light source LS1, second light sources LS21 and LS22, a third light source LS3, an optical sensor 11 and a processor 13. For example referring to FIG. 4, the first light source LS1 projects a transverse light section toward the moving direction within a first time interval T1; the second light sources LS21 and LS22 respectively project a longitudinal light section toward the moving direction within a second time interval T2. The third light source LS3 is used to illuminate a front area of the moving direction.

As mentioned above, to cancel the interference from ambient light, the optical sensor 11 further captures a first dark image frame, for differencing with the first image frame, within a first dark interval (e.g., T3 in FIG. 4) of first light source prior to or behind the first time interval T1; and captures a second dark image frame, for differencing with the second image frame, within a second dark interval (e.g., T3 in FIG. 4) of second light source prior to or behind the second time interval T2. The optical sensor 11 respectively captures the first image frame and the second image frame within the first time interval T1 and the second time interval T2.

In this embodiment, the pixel array of the optical sensor 11 receives incident light via the light filter 15.

The processor 13 identifies an obstacle according to the first image frame and the second image frame, wherein the method of identifying the obstacle has been described above and thus details thereof are not repeated herein. After the obstacle is found, the processor 13 controls the third light source LS3 to light up within a third time interval (e.g., T3 in FIG. 2) and controls the optical sensor 11 to capture a third image frame within the third time interval.

In this embodiment, before appearance of the obstacle is identified by the processor 13, the third light source LS3 is not lighted up, and thus the operational timing of the mobile robot 100 is shown as FIG. 4. When identifying that any obstacle appears, the processor 13 controls the third light source LS3 to emit light and controls the optical sensor 11 to capture one third image frame during the third light source LS3 is emitting light. In other aspects, more than one third image frame may be captured. In the present disclosure, capturing one third image frame is taken as an example for illustration. In this embodiment, the third image frame is for the object recognition using a pre-trained learning model.

After receiving the third image frame from the optical sensor 11, the processor 13 determines a region of interest (ROI) in the third image frame according to a position of obstacle (i.e. the position of broken line), e.g., shown in FIGS. 6A and 6B. As the present disclosure uses a single optical sensor, after the processor 13 identifies a position of obstacle and determines the ROI according to the first image frame and the second image frame, the ROI directly maps to a corresponding region in the third image frame.

In one non-limiting aspect, the ROI has a predetermined image size. That is, when the position (e.g., center or gravity center, but not limited to) of one obstacle is determined, the processor 13 determines a region of interest having the predetermined size at the position.

In another aspect, a size of the ROI is determined by the processor 13 according to the first image frame and the second image frame. In this case, when the obstacle is larger, the ROI is larger; on the contrary, the ROI is smaller.

The processor 13 then recognizes an object type of the obstacle in the ROI using a pre-trained learning model (e.g., embedded in the processor 13 by means of ASIC or firmware). As the learning model does not recognize (e.g., not calculating convolution) rest region in the third image frame outside the ROI, the computation loading, time and power consumption are significantly reduced. Meanwhile, as the ROI contains a small number of object images, the recognition is not interfered by other object images to improve the recognition correctness.

In addition, to further improve the recognition correctness, the processor 13 further identifies a height of obstacle according to the second image frame, e.g., taking a length H of the broken line in FIG. 6B as the height of an obstacle. The learning model further recognizes the object type according to the object height.

In one aspect, the object height is used as the learning material by the data network architecture (e.g., including neural network learning algorithm, deep learning algorithm, but not limited to) together with the ground truth image in a training phase to generate the learning model.

In another aspect, in the training phase, the data network architecture only uses the ground truth image to generate the learning model. In operation, when the learning model calculates the probability of several possible objects, the height is used to filter some possible objects. For example, if the height of one object type categorized by the learning model exceeds the height identified according to the second image frame, even though this one object type has the highest probability, the learning model still excludes this object type.

The method of categorizing the object in an image by the learning model is known to the art, and thus details thereof are not described herein. Meanwhile, the incorporation between the learning model and the object height to recognize the obstacle is not limited to that described in the present disclosure.

In one aspect, as a capturing frequency of the optical sensor 11 is higher than a moving speed of the mobile robot 100, the processor 13 further controls the first light source LS1, the second light sources LS21 and LS22, and the third light source LS3 to turn off for a predetermined time interval after the third time interval T3 (i.e. after capturing one third image frame) till the obstacle leaves the projection range of the first light source LS1. In this way, it is able to prevent repeatedly recognizing the same obstacle. The predetermined time interval is determined according to, for example, the moving speed of the mobile robot 100 and the height determined according to the second image frame.

Figure 5:
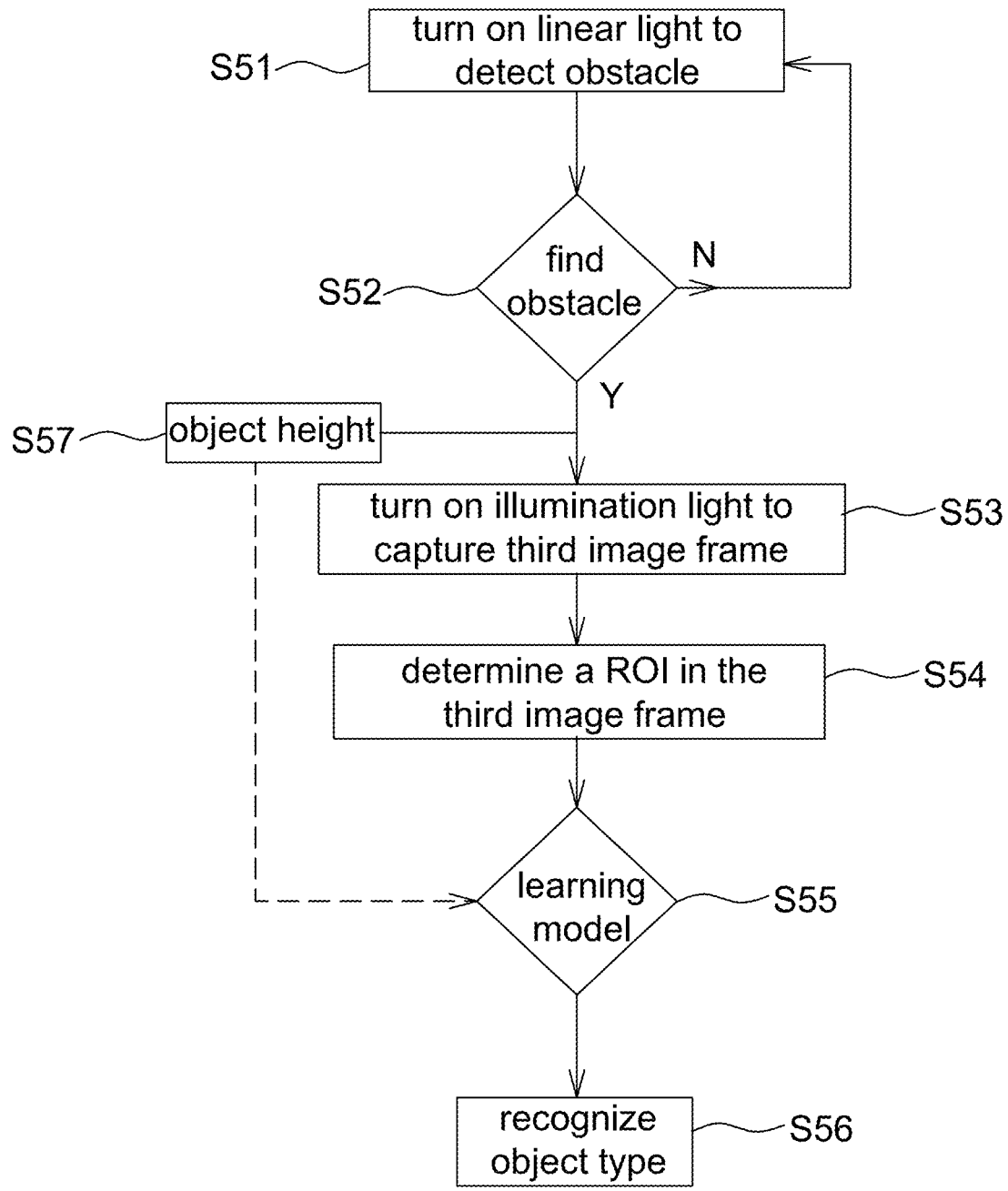
FIG. 5 is a flow chart of an operating method of a mobile robot according to a second embodiment of the present disclosure.

Referring to FIG. 5, it is a flow chart of an operating method of a mobile robot 100 according to one embodiment of the present disclosure, the method including the steps of: turning on linear light to detect an obstacle (Step S51); identifying whether an obstacle exists (Step S52); when there is no obstacle, moving back to Step S51 to continuous the detecting; whereas when there is one obstacle, turning on illumination light to capture a third image frame (Step S53); determining a region of interest (ROI) in the third image frame (Step S54); and using a learning model to recognize an object type (Steps S55-S56). This embodiment further includes an optional step: detecting an object height as an auxiliary in recognizing the object type (Step S57).

In this embodiment, the linear light includes, for example, the first light source LS1 as well as the second light source LS21 and LS22 mentioned above. The illumination light includes, for example, the third light source LS3 mentioned above. It is appreciated that positions of every light source shown in FIG. 1A is only intended to illustrate but not to limit the present disclosure.

Step S51: The processor 13 respectively controls the first light source LS1 as well as the second light source LS21 and LS22 to light up, for example, at the first time interval T1 and the second time interval T2 as shown in FIG. 4. Meanwhile, the processor 13 controls the optical sensor 11 to capture a first image frame and a second image frame respectively within the first time interval T1 and the second time interval T2.

Step S52: When identifying that the first image frame contains the broken line as shown in FIG. 6A or the second image frame contains the broken line as shown in FIG. 6B, the processor 13 identifies that there is an obstacle in front. The procedure then enters the Step S53; on the contrary, when the processor 13 identifies that both the first and second image frames do not contain any broken line, the Step S51 is entered to continuously detect an obstacle.

When identifying that the first image frame or the second image frame contains the broken line, the processor 13 further records (e.g., in the memory) a position of broken line as the object position.

Step S53: The processor 13 then controls the third light source LS3 to turn on, e.g., at the third time interval T3 shown in FIG. 2. The processor 13 also controls the optical sensor 11 to capture a third image frame, which contains at least one object image, within the third time interval T3. In an aspect that the processor 13 recognizes the object using a single image, the processor 13 controls the third light source LS3 to turn on for one third time interval V3. In one aspect, after the third time interval T3, the processor 13 controls the first light source LS1 as well as the second light sources LS21 and LS22 to operate using the timing shown in FIG. 4. In another aspect, after the third time interval T3, the processor 13 controls all light sources to turn off for a predetermined time interval to prevent detecting the same obstacle repeatedly and then operate using the timing shown in FIG. 4.

Step S54: The processor 13 then determines the ROI in the third image frame. The ROI is at the object position determined in the Step S52. As mentioned above, a size of the ROI is determined previously or determined according to a width W of the broken line in the first image frame (as shown in FIG. 6A) and a height H of the broken line in the second image frame (as shown in FIG. 6B).

Steps S55-S56: Finally, the processor 13 recognizes the object image within the ROI using the learning model trained before shipment to identify an object type.

Step S57: To increase the recognition correctness, when identifying an obstacle in the Step S52, the processor 13 further identifies an object height according to the second image frame, e.g., according to H in FIG. 6B. The identified object height helps the learning model to categorize and recognize the object type. The step S57 is selectively implemented.

After the object type is recognized, the processor 13 bypasses or dodges specific obstacles or directly moves across some obstacles according to previously determined rules. The operation after the object type being recognized is set according to different applications without particular limitations.

It should be mentioned that although the above embodiments are described in the way that the second light sources LS21 and LS22 are turned on and off together, the present disclosure is not limited thereto. In other aspects, LS21 and LS22 are turned on sequentially (and optical sensor capturing images correspondingly) as long as LS21 and LS22 respectively project a longitudinal light section toward the moving direction.

Figure 7:
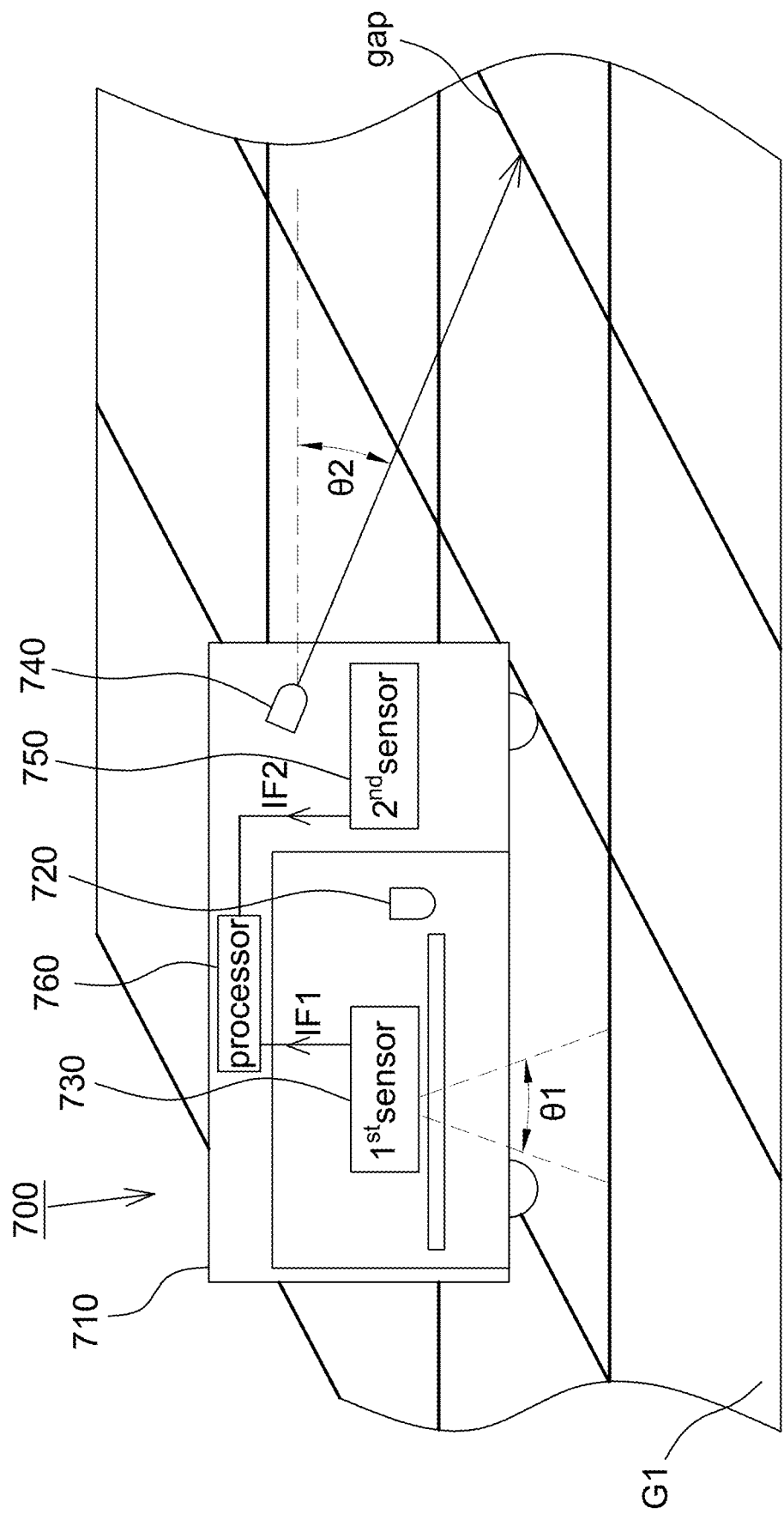
FIG. 7 is a schematic diagram of a mobile robot moving on ceramic tiles according to another embodiment of the present disclosure.

FIG. 7 is a schematic diagram illustrating a mobile robot 700 according to another embodiment of the present disclosure. Please referring to FIG. 7, the mobile robot 700 of this embodiment includes a housing 710, a first light source 720, a first optical sensor 730, a second light source 740, a second optical sensor 750 and a processor 760. The processor 760 is a central processor unit (CPU) or a microcontroller unit (MCU) of the mobile robot 700. The processor 760 is electrically coupled to the first optical sensor 730 and the second optical sensor 750 to respectively receive first image frames IF1 from the first optical sensor 730 and second image frames IF2 from the second optical sensor 750. The first image sensor 730 and the second optical sensor 750 have identical or different frame rates or types.

The first light source 720, the first optical sensor 730, the second light source 740 and the second optical sensor 750 are disposed in the housing 710. In this embodiment, the first light source 720 and the first optical sensor 730 are disposed at or close to a bottom surface of the housing 710. The second light source 740 and the second optical sensor 750 are disposed at a side surface of the housing 710 as shown in FIG. 7. FIG. 7 shows that the mobile robot 700 moves on a working surface G1 laid with tiles. Preferably, an area of each tile is larger than a field of view θ1 of the first optical sensor 730 to clearly present the benefit of the present disclosure.

In this embodiment, the first light source 720 illuminates the working surface G1 via a bottom opening of the housing 710 of the mobile robot 700, wherein the first light source 720 is an inviable light source, for example an infrared light source, e.g., infrared LED. The first optical sensor 730 has a field of view θ1 toward the bottom opening of the mobile robot 700 to sense the working surface G1 illuminated by the first light source 720 via the bottom opening using an exposure time, wherein the first optical sensor 730 is an image sensor, for example a CMOS or a CCD sensor and the exposure time thereof is determined by an auto exposure. The first optical sensor 730 (with its own processor) provides a displacement of the mobile robot 700 with respect to the working surface G1 according to the captured image frame (e.g., first image frame IF1) of the working surface G1, e.g., comparing image frames captured at different times. Or, the first optical sensor 730 provides first image frames IF1 to the processor 760, and the processor 760 calculates the displacement.

Figure 8:
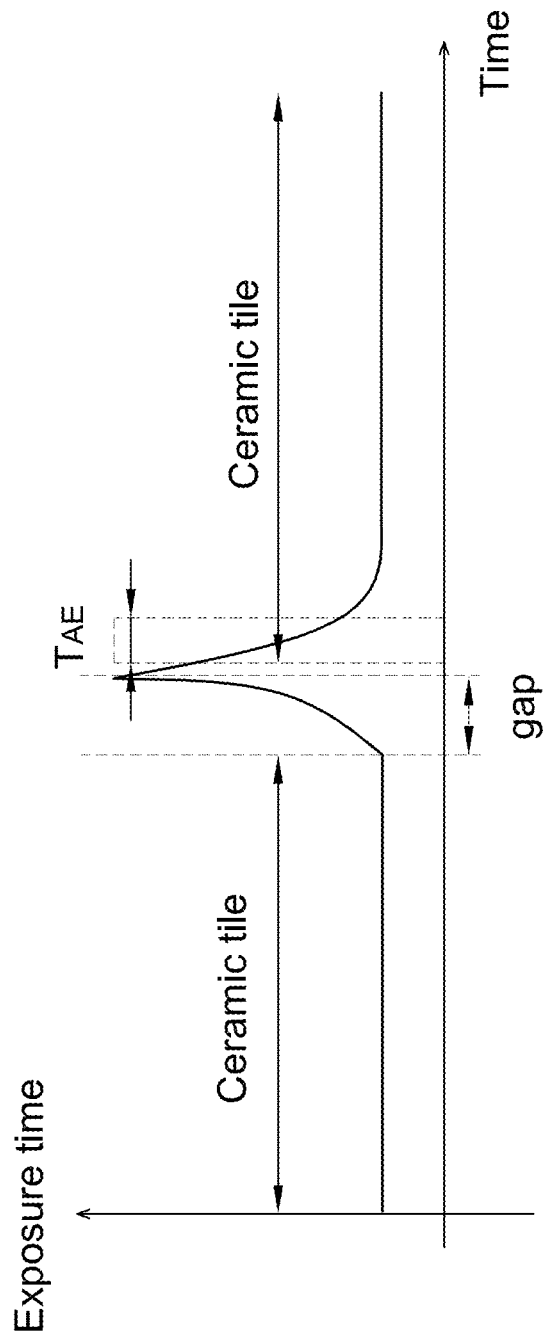
FIG. 8 is a schematic diagram of a variation of exposure time of an optical sensor based on the auto exposure of a mobile robot that moves across a gap between ceramic tiles.

When a type of the working surface G1 is a ceramic tile, reflectivity of the gap between ceramic tiles is significantly lower than the ceramic tile, and the gap between ceramic tiles will be hard to reflect light from the first light source 720. In detail, for maintaining the brightness of the first image frame IF1 sensed by the first optical sensor 730, the exposure time of the first optical sensor 730 is increased automatically, by the auto exposure, when the mobile robot 700 goes through the gap between ceramic tiles as shown in FIG. 7. After the mobile robot 700 moves over the gap between ceramic tiles and moves on a ceramic tile, it is too late for automatically shortening, using the auto exposure, the exposure time of the first optical sensor 730 as show in FIG. 8. FIG. 8 is a schematic diagram of a variation of exposure time of an optical sensor (e.g., the first optical sensor 730 herein) based on the auto exposure of a mobile robot 700 that moves across a gap between ceramic tiles. It is seen from FIG. 8 that a high exposure time is used within a time interval $T_{AE}$ even the mobile robot 700 is moving upon a ceramic tile without a gap. Therefore, the first image frame IF1 sensed by first optical sensor 730 within the time interval $T_{AE}$ is overexposed, and the first optical sensor 730 is not able to provide correct displacement.

For solving the above issue, the mobile robot 700 of this embodiment identifies whether there is a gap between ceramic tiles or not by using the forward second optical sensor 750 and the forward second light source 740 as shown in FIG. 7, wherein the second light source 740 is a vertical and/or horizontal linear light source, e.g., at least one of LS1, LS21 and LS22 shown in FIG. 1A. In this embodiment, a beam angle of the second light source 740 illuminated toward a moving direction of the mobile robot 700 on the working surface G1 is tiled by an angle θ2 as shown in FIG. 7, wherein the angle θ2 is larger than 0 degree and smaller than 90 degrees.

Figure 9A:
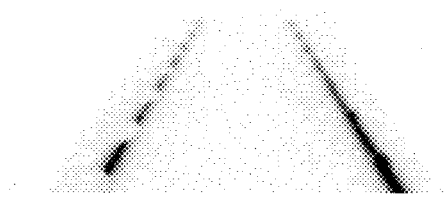
FIG. 9A is a schematic diagram of an image frame containing an image of ceramic tiles when longitudinal light sections are projected in a moving direction of mobile robot according to one embodiment of the present disclosure.
Figure 9B:
FIG. 9B is a schematic diagram of an image frame containing an image of ceramic tiles when a transverse light section is projected in a moving direction of mobile robot according to one embodiment of the present disclosure.

When the image frame (e.g., second image frame IF2) sensed by the second optical sensor 750 contains an image in FIG. 9A or FIG. 9B which contains the light section projected by the second light source 740, the second optical sensor 750 (with its own processor) or the processor 760 can identify the gap between ceramic tiles in front of the mobile robot 700 by using the image shown in FIG. 9A or FIG. 9B. For example, a processor 760 recognizes the image of tiles using a model previously trained by a machine learning algorithm, e.g., using convolution neural network, but not limited to.

Figure 10:
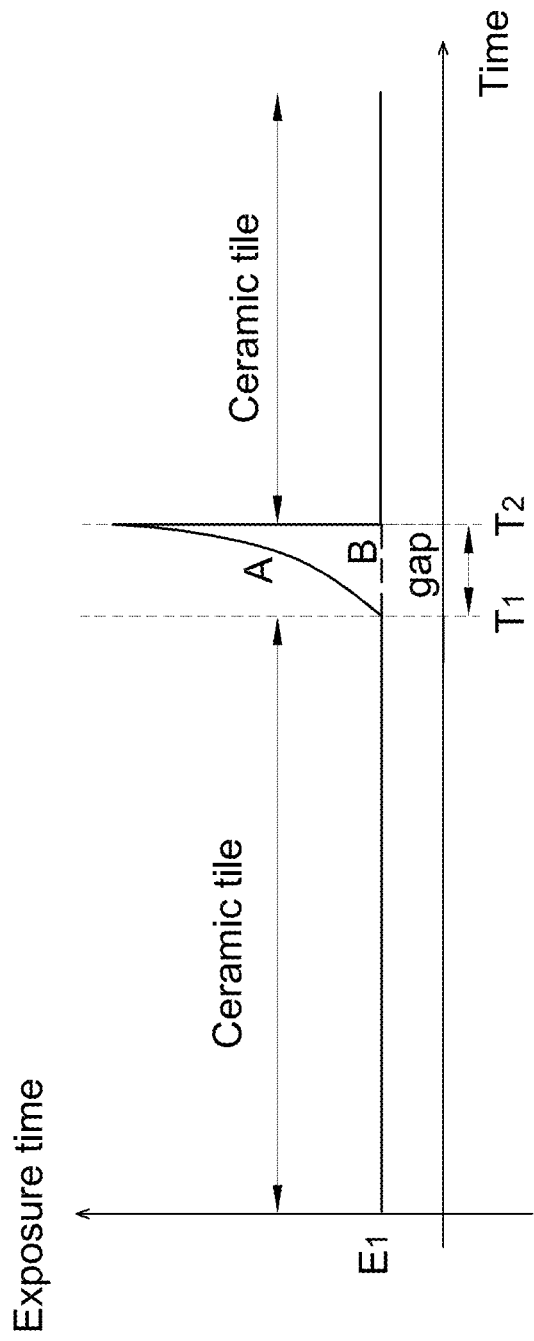
FIG. 10 is a schematic diagram of a variation of exposure time of an optical sensor not based on the auto exposure of a mobile robot that moves across a gap between ceramic tiles.

In this embodiment, since the information of the gap between ceramic tiles in front of the mobile robot 700 can be sensed by the second optical sensor 750, the exposure time of the first optical sensor 730 is rapidly shortened to a proper exposure time at time T2 as shown in FIG. 10.

In one aspect, the processor 760 recognizes whether the second image frame IF2 contains an image of tiles, e.g., using the machine learning. Then, the processor 760 predicts a time interval, e.g., T1 to T2 shown in FIG. 10, during which the field of view θ1 of the first optical sensor 730 contains a gap image between tiles when the second image frame IF2 is recognized containing the image of tiles. If there is not gap in front, the first optical sensor 730 continuously determines the exposure time using auto exposure. The processor 760 turns off the auto exposure of the first optical sensor 730 during the time interval between T1 and T2 such that the exposure time of the first optical sensor 730 at or after time T2 is selected as that determined at or before time T1. In this aspect, the processor 760 calculates the time interval between T1 and T2 according to a moving speed, e.g., calculated using the first image frame IF1, of the mobile robot 700 in conjunction of a distance, calculated using the second image frame IF2, from a gap associated with the gap image. The moving speed is calculated by comparing two first image frames, e.g., calculating the correlation therebetween, but not limited thereto. For example, when the second image frame IF2 contains an image of tiles as shown in FIG. 9A, the processor 760 calculates the distance from the gap according to a location of a broken position in the second image frame IF2; whereas when the second image frame IF2 contains an image of tiles as shown in FIG. 9B, the processor 760 calculates the distance from the gap according to a difference between upper lines and lower lines. One example of identifying a distance according to FIGS. 9A and 9B may be referred to U.S. application Ser. No. 16/258,675, filed on Jan. 28, 2019, assigned to the same assignee of the present application, and the full disclosure of which is incorporated herein by reference.

In this aspect, the processor 760 controls the first optical sensor 730 to capture the first image frame IF1 during the time interval between T1 and T2 using the exposure time being used right before the time interval, i.e. E1 determined at or prior to time T1. After the time interval, i.e. at or behind time T2, the processor 760 turns on the auto exposure of the first optical sensor 730 again. In this way, the exposure time of the first optical sensor 730 is operated following a dashed line section B as shown in FIG. 10 and is not affected by the appearance of the gap between tiles.

In another aspect, the exposure time within the time interval between T1 and T2 is selected as slightly higher than E1, e.g., 1.5E1, 2E1, 2.5E1 or 3E1, since the first image frame IF1 captured by the first optical sensor 730 within the time interval between T1 and T2 contains a gap image having lower reflectivity.

In an alternative aspect, the processor 760 recognizes whether the second image frame IF2 contains an image of tiles, predicts a time interval, e.g., T1 to T2 shown in FIG. 10, during which the field of view θ1 of the first optical sensor 730 contains a gap image between tiles when the second image frame IF2 is recognized containing the image of tiles, and controls the first optical sensor 730 to capture the first image frame IF1 at an end of the time interval, i.e. at or after time T2, using a resumed exposure time identical to a recorded exposure time being used right before the time interval, e.g., recorded at or before time T1. In this aspect, the processor 760 determines the exposure time of the first optical sensor 730 used within the time interval between T1 and T2 using auto exposure, e.g., shown as a curve A in FIG. 10. As long as the operating time reaches the time T2, the processor 760 controls the first optical sensor 730 to capture the first image frame IF1 using the resumed exposure time, e.g., equal to E1. When the first optical sensor 730 uses the resumed exposure time to capture the first image frame IF1, the auto exposure thereof is turned off. In this way, the first optical sensor 730 also uses a proper exposure time to capture the first image frame IF1 once the image of gap between tiles disappears from the field of view θ1 of the first optical sensor 730.

Figure 11:
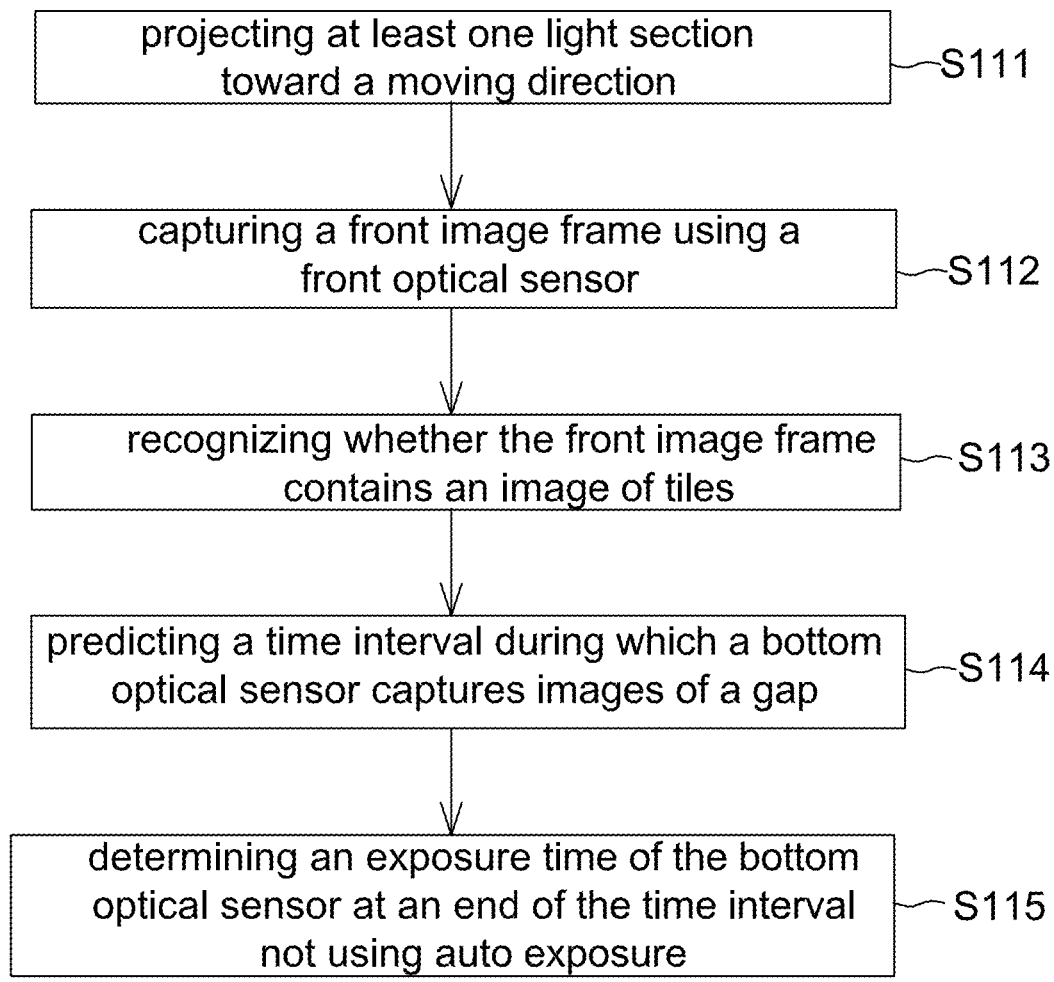
FIG. 11 is an operating method of a mobile robot according to one embodiment of the present disclosure.

Referring to FIG. 11, it is an operating method of a mobile robot 700 according to one embodiment of the present disclosure, which includes the steps of: projecting at least one light section toward a moving direction of the mobile robot 700 (Step S111); capturing a front image frame using a front optical sensor (Step 112); recognizing whether the front image frame contains an image of tiles (Step 113); predicting a time interval during which a bottom optical sensor captures images of a gap between tiles (Step 114); and determining an exposure time of the bottom optical sensor at an end of the time interval not using an auto exposure (Step 115). In this operating method, the front optical sensor is, for example, the second optical sensor 750 in FIG. 7, and the bottom optical sensor is, for example, the first optical sensor 730 in FIG. 7. Accordingly, the bottom optical sensor captures bottom image frames, e.g., first image frames IF1, via a bottom opening of the housing 710, and the front optical sensor captures front image frames, e.g., second image frames IF2, toward a moving direction of the mobile robot 700.

Step S111: As mentioned above, the mobile robot 700 has at least one light source, e.g., LS1, LS21 and LS22 in FIG. 1A, for projecting at least one of a longitudinal light section and a transverse light section on the working surface G1 toward the moving direction of the mobile robot 700.

Step 112: The front optical sensor 750 captures second image frames IF2 at a predetermined frame rate.

Step 113: The processor 760 receives the second image frames IF2 from the front optical sensor 750 and recognizes whether the second image frames IF2 contain an image of tiles, e.g., using model trained by machine learning.

Step S114: If the second image frames IF2 are recognized to contain an image of tiles, the processor 760 predicts a time interval, e.g., T1 to T2 shown in FIG. 10, during which the bottom optical sensor 730 will capture images of a gap between tiles.

Step S115: In the time interval between T1 and T2, if the auto exposure is used by the bottom optical sensor 730, the exposure time is sharply increased as a curve A shown in FIG. 10 that will cause the exposure time to be difficult go back to E1 in time at time T2. Accordingly, the processor 760 intervenes in controlling the exposure time at time T2.

The Steps S111 to S115 in FIG. 11 are performed repeatedly when the mobile robot 700 continuously to move across different gaps between tiles.

In one aspect, the processor 760 controls the bottom optical sensor 730 to capture a bottom image frame during the time interval between T1 and T2 and at an end of the time interval, e.g., at or after time T2 using the exposure time, e.g., E1, being used right before the time interval, e.g., at or before time T1. Within the time interval between T1 and T2, the auto exposure of the bottom optical sensor 730 is closed or deactivated.

In another aspect, the processor 760 records the exposure time, e.g., E1, being used by the bottom optical sensor 730 before the time interval, e.g., at or before time T1, in a memory. Then, the processor 760 controls the bottom optical sensor 730 to capture a bottom image frame at an end of the time interval, i.e. at or after time T2, using the recorded exposure time. In this aspect, the bottom optical sensor 730 still captures, within the time interval between T1 and T2, the bottom image frame using an exposure time determined by the auto exposure.

In the present disclosure, the auto exposure of the first optical sensor 730 is turned off and turned on according to whether a gap between tiles will be captured by the first optical sensor 730. However, the second optical sensor 750 is not controlled to turned on/off the auto exposure thereof.

It should be mentioned that although the above embodiment is illustrated by using the ceramic tile as an example, the present disclosure is not limited thereto. The tiles may have other materials and are not limited to ceramic tiles.

In addition, a number of first light source, the second light source and the third light source is not limited to those shown in FIG. 1A. The first light source, the second light source and the third light source may respectively include multiple light sources to turn on and off simultaneously.

In the present disclosure, the "transverse" is referred to substantially parallel to a moving surface (e.g., the ground), and the "longitudinal" is referred to substantially perpendicular to the moving surface. The object on the moving path is called the obstacle.

As mentioned above, the conventional cleaning robot adopts multiple types of sensors to respectively implement different detecting functions, and has the issues of high computation loading, time and consumption power as well as low recognition correctness. Accordingly, the present disclosure further provides a mobile robot suitable to smart home (e.g. FIGS. 1 and 2) and an operating method thereof (e.g. FIG. 5) that achieve the objective of obstacle avoidance, positioning and object recognition according to the detection result of a single image sensor.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A mobile robot, comprising:
a first optical sensor, having a field of view toward a bottom opening of the mobile robot, and configured to capture a first image frame using an exposure time determined by an auto exposure;
a light source, configured to project a light section toward a moving direction of the mobile robot;
a second optical sensor, configured to capture a second image frame containing the light section; and
a processor, electrically coupled to the first optical sensor and the second optical sensor, and configured to
recognize whether the second image frame contains an image of tiles,
predict a time interval during which the field of view of the first optical sensor contains a gap image between tiles when the second image frame is recognized containing the image of tiles, and
turn off the auto exposure of the first optical sensor during the time interval.

2. The mobile robot as claimed in claim 1, wherein the light section comprises at least one of a longitudinal light section or a transverse light section.

3. The mobile robot as claimed in claim 1, further comprising another light source configured to illuminate via the bottom opening of the mobile robot.

4. The mobile robot as claimed in claim 1, wherein the processor is configured to recognize the image of tiles using a model previously trained by a machine learning algorithm.

5. The mobile robot as claimed in claim 1, wherein the processor is configured to calculate the time interval according to a moving speed, calculated using the first image frame, of the mobile robot and a distance, calculated using the second image frame, from a gap associated with the gap image.

6. The mobile robot as claimed in claim 1, wherein the processor is further configured to control the first optical sensor to capture the first image frame during the time interval using the exposure time being used right before the time interval.

7. The mobile robot as claimed in claim 1, wherein the processor is further configured to turn on the auto exposure again after the time interval.

8. A mobile robot, comprising:
a first optical sensor, having a field of view toward a bottom opening of the mobile robot, and configured to capture a first image frame using an exposure time determined by an auto exposure;
a light source, configured to project a light section toward a moving direction of the mobile robot;
a second optical sensor, configured to capture a second image frame containing the light section; and
a processor, electrically coupled to the first optical sensor and the second optical sensor, and configured to
recognize whether the second image frame contains an image of tiles,
predict a time interval during which the field of view of the first optical sensor contains a gap image between tiles when the second image frame is recognized containing the image of tiles, and
control the first optical sensor to capture the first image frame at an end of the time interval using a resumed exposure time identical to a recorded exposure time being used right before the time interval.

9. The mobile robot as claimed in claim 8, wherein the light section comprises at least one of a longitudinal light section or a transverse light section.

10. The mobile robot as claimed in claim 8, further comprising another light source configured to illuminate via the bottom opening of the mobile robot.

11. The mobile robot as claimed in claim 8, wherein the processor is configured to recognize the image of tiles using a model previously trained by a machine learning algorithm.

12. The mobile robot as claimed in claim 8, wherein the processor is configured to calculate the time interval according to a moving speed, calculated using the first image frame, of the mobile robot and a distance, calculated using the second image frame, from a gap associated with the gap image.

13. The mobile robot as claimed in claim 8, wherein the processor is configured to determine the exposure time of the first optical sensor used within the time interval using the auto exposure.

14. The mobile robot as claimed in claim 13, wherein the processor is configured to turn off the auto exposure of the first optical sensor when using the resumed exposure time to capture the first image frame.

15. An operating method of a mobile robot, the mobile robot comprising a front optical sensor, a light source and a bottom optical sensor, the operating method comprising:
projecting at least one light section toward a moving direction of the mobile robot;
capturing a front image frame using the front optical sensor;
recognizing whether the front image frame contains an image of tiles;
predicting a time interval during which the bottom optical sensor captures images of a gap between tiles; and
determining an exposure time of the bottom optical sensor at an end of the time interval not using an auto exposure.

16. The operating method as claimed in claim 15, wherein the light section comprises at least one of a longitudinal light section and a transverse light section.

17. The operating method as claimed in claim 15, further comprising:
capturing, by the bottom optical sensor, a bottom image frame during the time interval and at the end of the time interval using the exposure time being used right before the time interval.

18. The operating method as claimed in claim 17, further comprising:
turning off the auto exposure within the time interval.

19. The operating method as claimed in claim 15, further comprising:
recording the exposure time being used by the bottom optical sensor before the time interval; and
capturing, by the bottom optical sensor, a bottom image frame at the end of the time interval using the recorded exposure time.

20. The operating method as claimed in claim 19, wherein the bottom optical sensor captures, within the time interval, the bottom image frame using the exposure time determined using the auto exposure.

\* \* \* \* \*